United States Patent [19]
Caprio

[11] Patent Number: 5,853,122
[45] Date of Patent: Dec. 29, 1998

[54] RELATIVE HUMIDITY SENSITIVE IRRIGATION VALVE CONTROL

[76] Inventor: Alphonse E. Caprio, 7608 William Moyers Ave. NE., Albuquerque, N. Mex. 87122

[21] Appl. No.: 962,555

[22] Filed: Oct. 31, 1997

Related U.S. Application Data

[63] Continuation-in-part of Ser. No. 745,461, Nov. 12, 1996, abandoned.

[51] Int. Cl.$^6$ .................................................. G05D 27/00
[52] U.S. Cl. .......................................... 236/44 C; 239/63
[58] Field of Search .............................. 236/44 A, 44 C; 137/78.2, 78.5; 239/63, 64; 165/224, 229

[56] References Cited

U.S. PATENT DOCUMENTS

| | | | |
|---|---|---|---|
| 4,182,357 | 1/1980 | Orastein | 137/1 |
| 4,246,574 | 1/1981 | Sanner | 239/63 |
| 4,430,828 | 2/1984 | Oglevee et al. | 47/17 |
| 4,502,288 | 3/1985 | Lynch | 62/171 |
| 4,552,303 | 11/1985 | Fisher et al. | 236/44 C |
| 4,718,446 | 1/1988 | Simpson | 239/64 |
| 4,852,802 | 8/1989 | Iggulden et al. | 239/64 |
| 4,858,377 | 8/1989 | Oglevee et al. | 47/17 |
| 5,097,861 | 3/1992 | Hopkins et al. | 137/78.3 |
| 5,364,024 | 11/1994 | Lin | 236/44 C |
| 5,400,608 | 3/1995 | Steed et al. | 236/44 C |
| 5,450,893 | 9/1995 | Balba et al. | 236/44 C |
| 5,675,979 | 10/1997 | Shah | 236/44 C |

FOREIGN PATENT DOCUMENTS

| 5-126385 | 5/1993 | Japan | 176/224 |
|---|---|---|---|

*Primary Examiner*—William E. Tapolcal

[57] ABSTRACT

An electrically operated valve controls the flow of irrigation water. A clock or computer controls the time of day and a programmed watering schedule. The clock signal is serially connected through differential relative humidity (RH) and temperature sensitive circuits. These circuits sense the difference between the surrounding RH and above ground temperature and set points derived from meterological "Normals, Means, and Extremes" weather data. When the difference between the set point readings and the surrounding RH or temperature becomes zero and beyond, solenoid activation is prevented during and sometimes before inappropriate weather and evapotranspiration conditions, such as rain, snow, or freeze.

7 Claims, 4 Drawing Sheets

RELATIVE HUMIDITY SENSITIVE IRRIGATION VALVE CONTROL (A Continuation-In-Part based on application Ser. No. 08/745,461, filed Nov. 12, 1996, now abandoned, and applicants Disclosure Documents Nos. 390956 dated Feb. 5, 1996 and 404299 dated Aug. 29, 1996, copies enclosed).

BACKGROUND-CROSS REFERENCE TO RELATED APPLICATIONS

| U.S. Pat. DOCUMENTS | | | |
|---|---|---|---|
| 3,991,939 | 11/1996 | Maclay | 137/624.11 |
| 4,246,574 | 1/1981 | Sanner | 137/78.3 |
| 4,256,133 | 3/1991 | Coward et al | 137/78.3 |

1. Background Field of the Invention

The present invention relates to an irrigation sprinkler control system wherein a clock timer controls the duration and time of day for watering. A combination switch consisting of a series connected humidistat and a cooling thermostat compares the ambient humidity and temperature to preset threshold set points and is connected serially between the timer and the solenoid operated valves to prevent irrigation during and sometimes before inappropriate irrigation conditions exist.

2. Background—Prior Art Supplemental irrigation is needed in many arid areas for supplying water to the landscape shrubbery and vegetation. Clock 2 shown in FIG. 1, in conjunction with electrically activated valves 8 which supply water to the irrigation system, are often used to minimize the manual labor of such irrigation and to avoid loss of plants when irrigation needs are overlooked. The clock can be programmed to sequentially activate the solenoid valves 10 on a daily, weekly, monthly and yearly schedule for individual watering durations for each solenoid valve control. Such clocks often have a plurality of zones 23 which can be connected to different water control valves for the control thereof. Water is therefore delivered to each zone only in accordance with the programmed schedule. Maclay, Sanner and Coward have given some recognition in the art that it is thoughtless to operate the sprinkler system when it is raining, snowing or freezing outside. Many controllers have a manually controlled "rain switch" which disables irrigation. If the switch is left off, no irrigation will be resumed when the rain stops and watering is again needed unless the switch is turned on again.

Other controllers 2 have a series connection to which a rain "sensor" can be operably connected. The typical rain sensor is a water container with a float which operates a switch when sufficient rain water is collected. A more exotic variation of the above is the use of underground moisture sensing probes which are placed close to the timer controller. This prior art presupposes that the moisture level at the probe location is typical of the entire area to be irrigated. This led to the development of individual moisture sensors and probes that had to be located near the various greenery.

Still another more sophisticated approach is the use of a computer system into which historical-seasonal weather data such as evapotranspiration rates, relative humidity, winds, temperature etc. are programmed into the computer data bank so that a watering schedule may be predicted. This system offers a remote control link either via RF waves or direct signal interfaces with control valves but often lacks the capability to override the predicted schedule in the event of inappropriate watering conditions on a real time bases.

OBJECTS AND ADVANTAGES

The object and advantage of this invention is to provide a real time-sprinkler control system upgrade which is weather and evapotranspiration sensitive to prevent activation of the sprinkler system when precipitation, temperature or E/T threshold levels are exceeded.

It is a further object and advantage of this invention to provide a weather and E/T responsive sprinkler control system upgrade which can be connected to a sprinkler control clock or a computer controlled link or other loads so that the clock or computer provides time control of sprinkler activation while a combination differential RH and temperature responsive sensor prevents activation of the sprinkler or other loads when the precipitation threshold is exceeded or the temperature is near freezing. The precipitation threshold has been discovered imperically to be the highest average relative humidity recorded by the National Weather Bureau for a given geographical area and at specific times of the day.

The preferred embodiment has the following advantages:

a) it is inexpensive b) it is simple to construct and is made up of standard components c) it requires no power to function d) it requires no software e) it can sense unfavorable watering conditions before they exist.

f) it requires no probes g) a single unit irrigation control can be linked to many irrigation controllers or loads.

h) it can combine evapotranspiration (E/T) sensitivity with RH when mounted near greenery.

Figure 1:
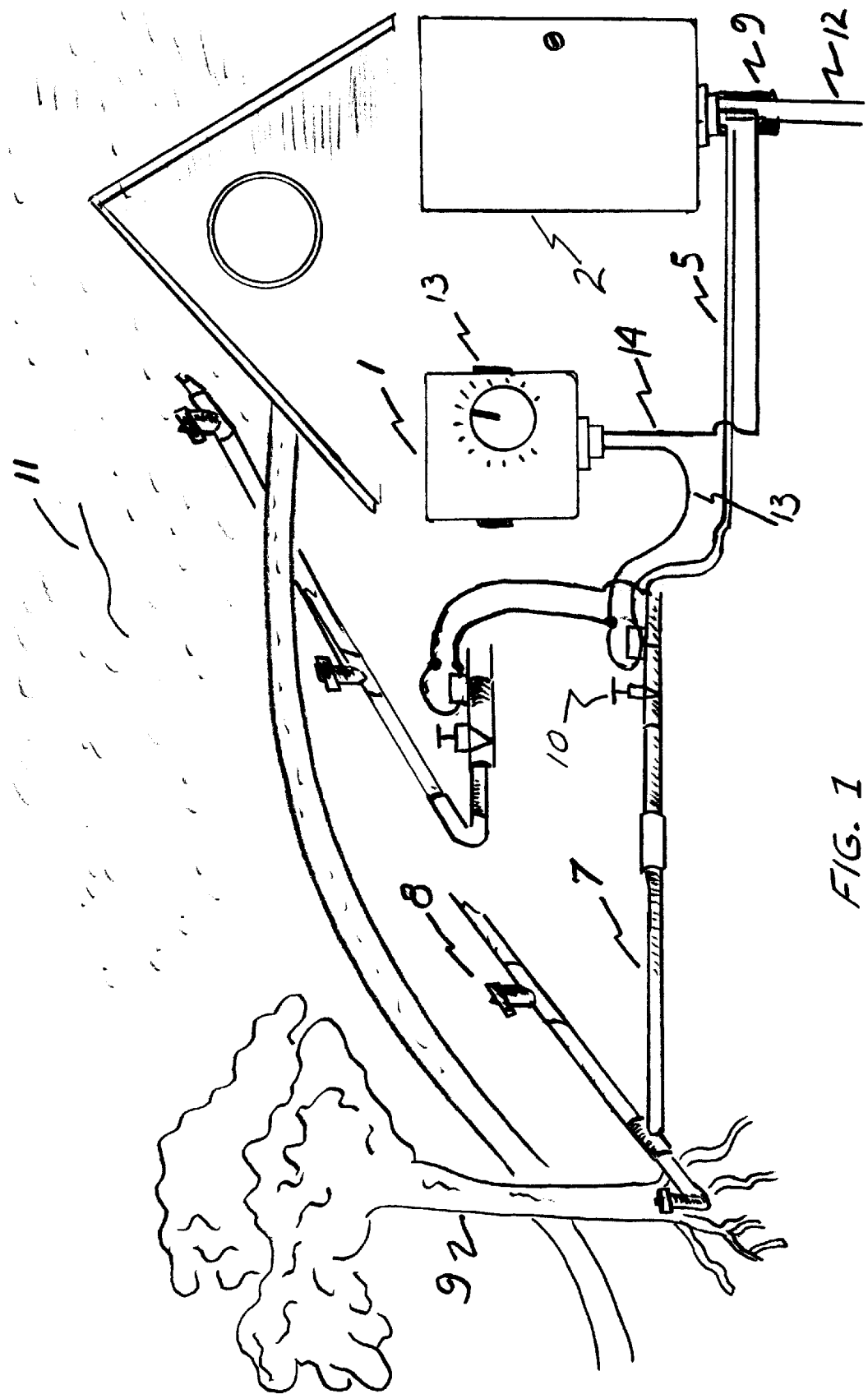
FIG. 1 is a diagrammatic view of a typical layout of lawn and garden input and output devices which may be connected to an irrigation timer or computer having my preferred weather and E/T sensitive interrupt system as illustrated in the lower righthand corner.

REFERENCE NUMERALS IN DRAWINGS 1 enclosure housing, humidistat and coolingstat
2 irrigation or computer output control box
3 air intake louver: Midget Louver Co. RLS Series, 1 " dia (or equivalent.
4 humidistat calibration template with control dial
5 timer or computer common wire
6 irrigation solenoid valve control wire
7 irrigation water feed pipe
8 sprinkler or drip head
9 tree trunk
10 irrigation control valve with solenoid
11 turf
12 power leads (24 VAC or 110 VAC)
13 solenoid valve, common wire
14 humidistat and coolingstat wires
15 Irrigation clock or computer control 16 clock or computer output terminal
16A clock or computer terminal strip
17 valve power output terminal
18 combination sensor enclosure
19 humidistat, Ranco #J10-2000-200 or electronic equivalent
20 coolingstat White Rogers #1C21-1 or electronic equivalent
21 irrigation valve common lead wire input
22 individual irrigation valve input
23 electrical control valve
24 AC power input
25 wire nut connection
26 switch cable for preferred embodiment
27 enclosure for preferred embodiment, Carlon #HE-442 or equivalent
28 calibration template Stubberfield #997230
29 set point assembly knob General Filter #1281 or equivalent
30 Mini Louver McMaster #2016K1(1" dia hole required)
31 conduit adapter PVC Ewing# 17001620 or equivalent
32 16–18 gauge insulated wire for sensor output
33 mounting bolts
34 front cover for sensor enclosure
35 base of inclosure
36 set screw for humidistat calibration
37 snap action contacts for coolingstat
38 coolingstat adjustment arm
39 bimetallic sensor coil for coolingstat
40 mounting holes for coolingstat (use #8/32×3/8 screws)
41 calibration dial for coolingstat
42 upper coolingstat output terminal
43 lower coolingstat output terminal
44 series connection between humidistat and coolingstat
45 humidistat output lead wire
46 right and left humidistat output terminal
47 humidistat mounting holes
48 control shaft for humidistat control shaft ((5/8' dia)

SUMMARY OF INVENTION

Stated in summary form, this invention is directed to a time, weather and E/T responsive sprinkler control system wherein above ground and serially connected differential relative humidity and temperature combination sensors are connected to a clock or computer controller in order to interrupt current flow to the water control valves when the weather or E/T is inappropriate for watering on a real time bases.

Other purposes and advantages will become apparent from a study of the following the specification, the claims and the attached drawings.

DESCRIPTION OF THE PREFERRED EMBODIMENT

FIG. 1 illustrates a sample layout of a plurality of typical lawn and garden input and output components surrounding a residential home. These components, are usually installed prior to adding the weather and E/T sensing features afforded by my invention. They may be connected as loads along with a clock or computer to the rectangular box 1 which encloses the combination sensors. The sensors, with the enclosure may be mounted to an outside pedestal, wall, tree, or on a the roof of of a nearby structure but away from the influence of direct sprinkler spray or direct sunlight which can cause distorted weather sensitivity. A mounting area which is both shady year-around and having a northern exposure is preferable. Standard household electrical power 12 is applied to the 24 volt transformer input of the existing irrigation clock or computer 2. The weather sensitive intervention provided by the said combination sensors enclosed in 1, are serially connected to the clock or computer via dedicated wires as a splice 25 between the timer common terminal and its common output wire 16 shared by each solenoid control valve. If the timer or computer have two terminals marked "sensor", the two combination sensor wires may be connected directly to them. The dedicated two conductor cable 14 can be buried or clamped along the structure wall entering the timer or computer via conduit 31.

The watering portion of the irrigation system usually include conventional or electromechanically operated solenoid valves 10 which control the flow of water to sprinklers 8 or drip emitters (not shown). These devices are connected in the usual fashion by polyvinyl chloride (PVC) or ABS (Trademark) plastic pipe 7 to a source of pressurized water (not illustrated). If there are auxiliary components such as pumps or master valves, which normally become activated when the irrigation valves are, the common power feed wire must be included with the solenoid valves serial connection with the combination sensor. The sensor interrupt function is accomplished when all common wires 21 are connected to the timer terminal 16 are removed and spliced at the wire nut connection 25 shown in FIG. 2.

Figure 2:
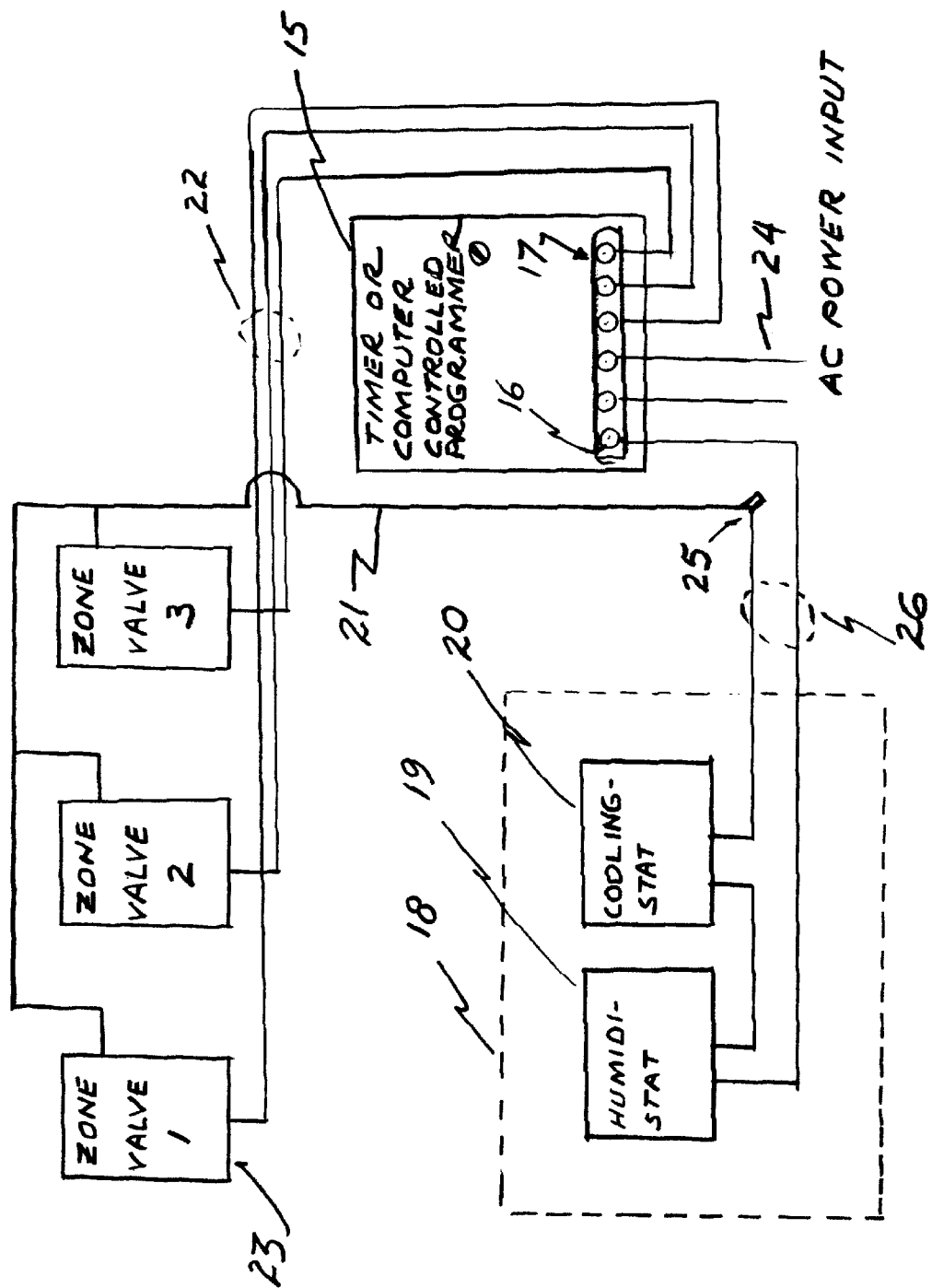
FIG. 2 is a block diagram of the preferred embodiment of my weather and E/T sensor system.

Still referring to FIG. 2, the series connection of the humidistat 19 and coolingstat 20 make up the combination switch which is connected between the timer or computer 15 lead wire 21 and the irrigation zone valves 23 lead wire via cable 22 and 26. The splice is made in the timer or computer output box using wire nut 25 between terminal 16 and the automatic weather sensitive switch 18 (the preferred embodiment). The individual irrigation valve wires 17, listed by valve numbers on terminal strip 16A, are left in tact at the timer terminals. Only the control valve, pump and master valve common wire are interrupted through the function of the preferred embodiment. The AC power input to the timer or computer 15 is 110VAC when the 24VAC step down transformer is assembled inside the timer or computer output box. Most indoor irrigation controllers use an external 24VAC transformer which is plugged into a 110VAC receptacle while the secondary terminals are externally routed to the timer power input 24 and wired to terminal strip 16A.

Figure 3:
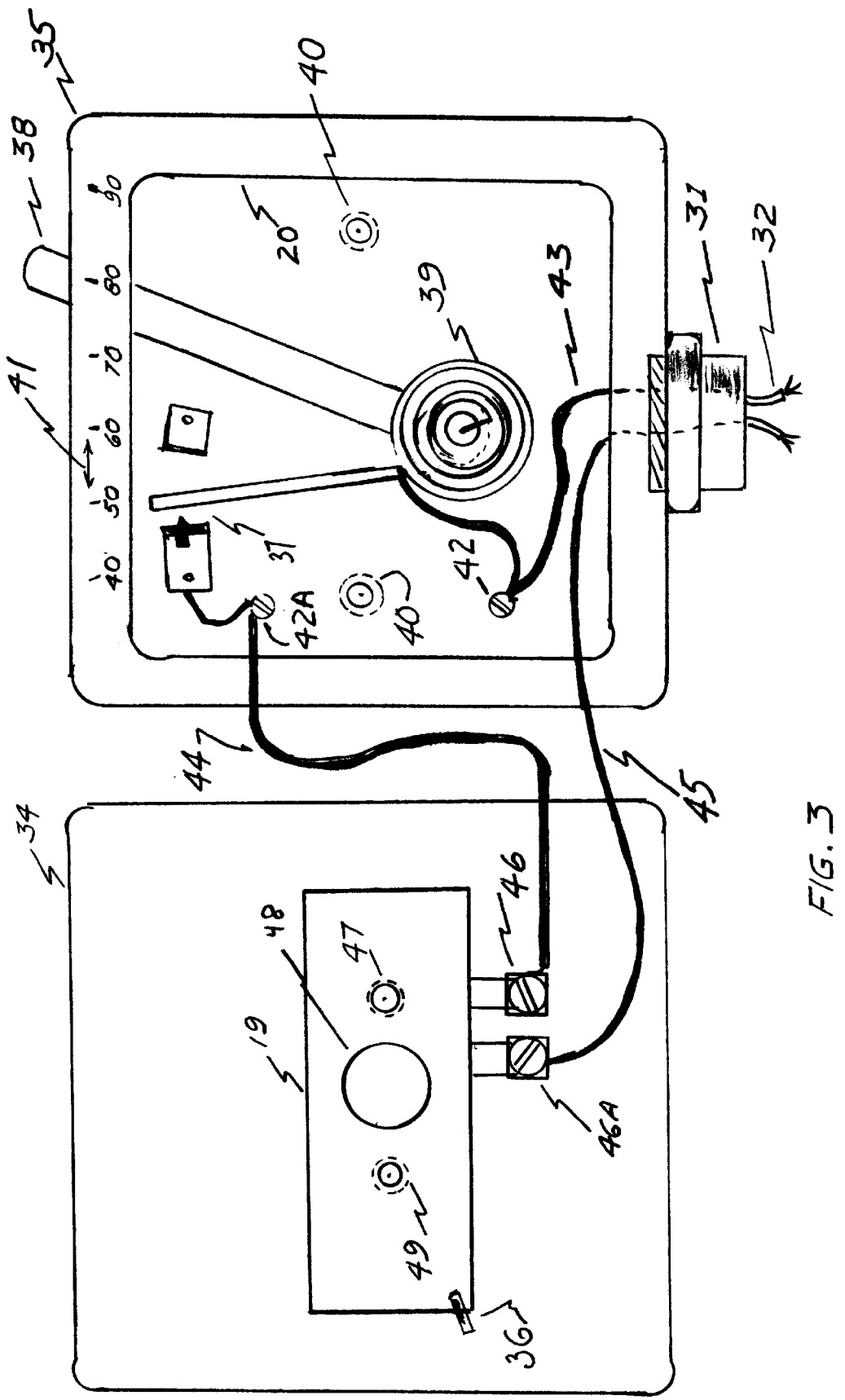
FIG. 3 is a wiring diagram of the two differential sensors as a combination switch
Figure 4:
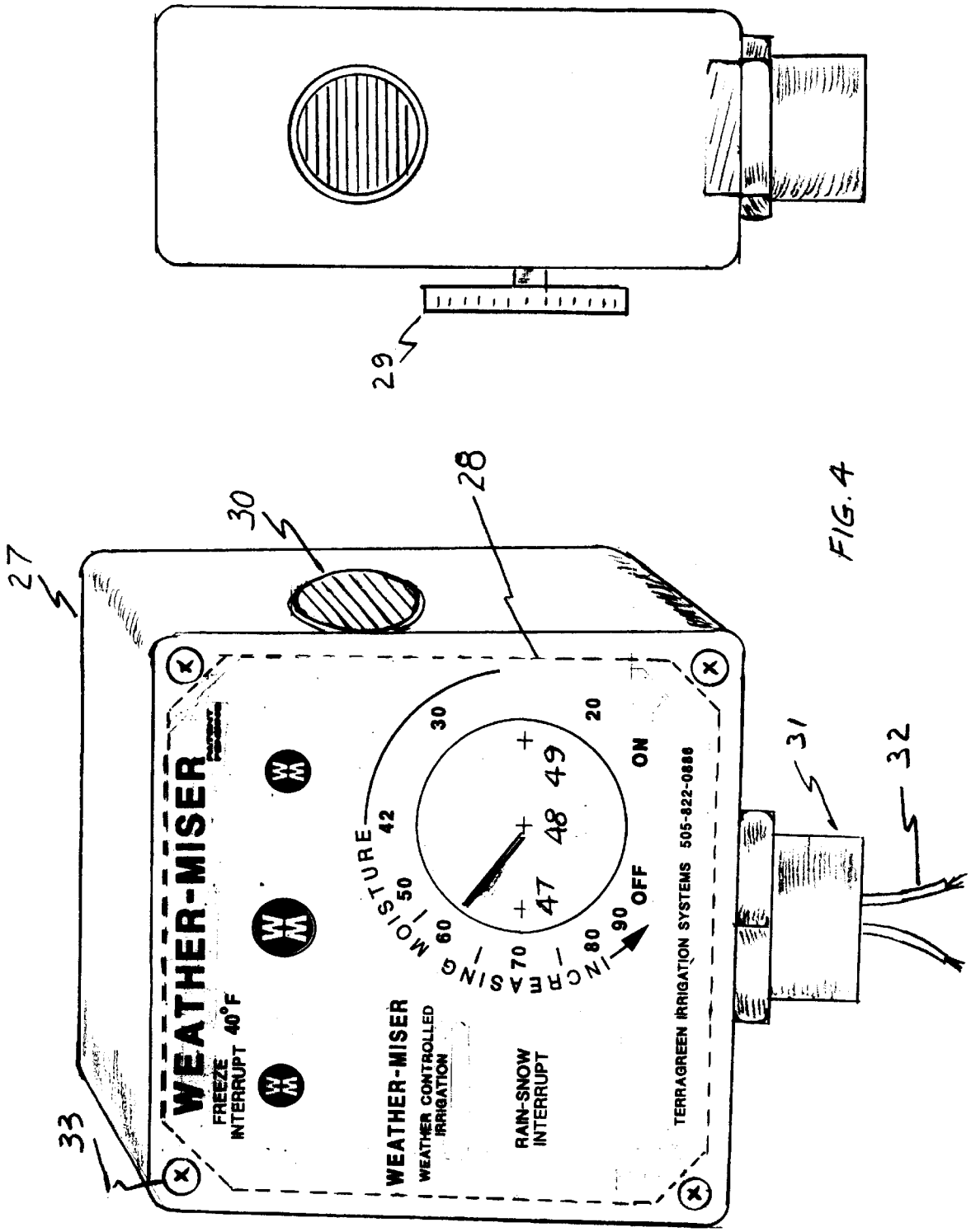
FIG. 4 is the enclosure for housing the combination sensors with a calibration dial.

FIG. 3 illustrates how the humidistat 19 and the coolingstat 35 are assembled to the rear face of the front cover 34 of the enclosure 27 as well as how the coolingstat is assembled to the inside of the base of the enclosure 27. The necessary wiring to make up said combination switch is also shown in FIG. 3. Templates for drilling the mounting holes used for assembling the humidistat 19 and coolingstat 20 are included with the listed manufacturer package. A full size copy of the face plate 28 of FIG. 4 may be used as a template. Three-1" dia holes are drilled symmetrically on the left, right and bottom of the enclosure box 27 and are used for assembling the left and right mini-louvers 30 and the conduit adapter 31. The four mounting bolts 33 are supplied with the enclosure assembly and should not be removed until the three-1 " dia holes are drilled. The calibrated template 28 is self adhesive and is fixed to the front face of 34 of the enclosure 27. The calibration label 28 is used as a template for drilling the three humidistat mounting holes; 47, 48 and 49; ⅛"; ½ " and ⅛" respectively. The humidistat is then mounted to, the rear face of the front cover 34 of the enclosure 27. Finally, the knob assembly 29 is mounted to the shaft of the humidistat 19. The humidistat calibration set screw 36 will be referred to later when system operation is discussed.

The coolingstat 20 has two mounting holes 40 and two electrical terminals 42 as well as a calibration dial 41. This assembly is placed symmetrically over the inside face of the enclosure base and used as a template for drilling two 8/32 holes 40. Two insulated 16–18 gauge wire leads 44 and 43 (at least 6" in length) are connected to the coolingstat 20 using terminals 42. The coolingstat is then assembled to the internal rear face of the enclosure 27 using two 8/32×3/8 self tapping screws. The coolingstat adjustment arm 38 is set to its lowest temperature set point (40 degrees F.) which is the extreme left position 41. The coolingstat assembly 20 is then placed in a household refrigerator (not the freezer) for 15–20 minutes after which time the arm 38 is adjusted until the contacts 37 just begin to open. The use of a mercury thermometer as the temperature of the refrigerator is adjusted to 40 degrees F. (if needed) is advised. The final wiring for the combination switch output 32 is accomplished by making the connection from terminal 42 to 42A using wire leads 43 and 45 respectively. The conduit 31 is then assembled to the base of the enclosure 35 as shown in FIG. 3. The two mini-louvers 30 are assembled on the left and right sides of the enclosure 27 so that the louvers face downward thus preventing rain to enter the enclosure. The wiring output 32 is then dressed to avoid contact with the sensing elements and routed through the conduit 31 before cover assembly 34 is assembled to the base 35 using hardware 33.

OPERATION OF INVENTION

The preferred embodiment functions as a combination differential RH and temperature sensitive switch which overrides clock or computer controlled irrigation valve current during and sometimes before inappropriate weather conditions prevail. The device invented continuously compares the ambient humidity and temperature to the set points and prevents inappropriate irrigation when these setpoints are surpassed.

The set point for the humidistat dial 29 and its calibration template 28 is derived from weather data published in the form of "Normals, Means and Extremes" 5A and 5B on record with the National Weather Bureau. It has been found that when dial 28 is set to the highest monthly average RH for a given geographical area for a specific time of the day, the humidistat contacts open and close as the difference between this set point and the prevailing RH become zero and beyond. It has been found that when said difference is zero or beyond, the likelihood of some form of precipitation is at least 85–90% or the E/T rate is so low, that irrigation is unnecessary. The highest average RH for any given geographical area typically occurs during the early morning hours and the lowest during the early evening hours of each day. For example, the highest yearly RN averages recorded for the Albuquerque, N. Mex. and Washington, D.C. areas is 70% and 75% respectively while the lowest yearly average for the same two areas is 29% and 53% respectively as shown in FIGS. 5 and 5A. Users of the preferred embodiment would use the higher or lower set points depending on the time of day irrigation is scheduled in the clock program. When an evening irrigation schedule is used, the humidistat requires less time to respond to the rapid increase in RH that precedes precipitation because the set point difference is 10%–20% less than the early morning setting. This explains why the preferred embodiment sometimes "forecasts" precipitation and prevents irrigation before as well as during precipitation. The humidity responsive part of the sensor continuously compares the ambient humidity to the set point and prevents energy flow to irrigation valves when the ambient humidity is greater than the threshold humidity setting.

Calibration of the humidistat is accomplished by setting dial 29 to the current RH available from the local weather service or readings taken from a hygrometer accurate to within 5%. The calibration set screw 36 is turned until two clicks are heard as the dial is turned clockwise and counterclockwise. The humidistat is calibrated when the set screw is left at the midpoint between the two clicks.

The temperature sensor is a coolingstat 20 whose electrical contacts open on falling temperature. The particular sensor named in the Reference Numeral 20 has magnetic-snap action contacts 37 which are self wiping and it has a low limit setting of 40 degrees F. In most applications, this sensor is adequate as supplied by the manufacturer. The outside mounting location of the preferred embodiment must be well ventilated and free from direct sunlight or direct irrigation spray. Locations such as those having northern exposures, naturally shade (behind bushes or trees, in doggy run areas) have been found to work well. If the sensors must be mounted near the influence of irrigation spray, the clock sequence must be changed if necessary, to schedule the influencing zone as the last one to be irrigated. The temperature responsive part of the combination sensor continuously compares the ambient temperature to the temperature set point and prevents energy flow to irrigation control valves when the ambient temperature is less than the set point.

When the preferred embodiment is mounted near bushes, plants or trees, the humidistat readings include the evapotransporation effects of the surrounding greenery as well as the RH. The preferred embodiment has been found to prevent irrigation during the aftermath of sustained precipitation wherein the ground is so saturated that many days must pass until the low evaporation rate no longer dominates the surrounding RH.

The serially connected-humidity and temperature responsive sensors will then work together to override timer or clock controlled irrigation when either of the setpoints are exceeded.

The operation check-out is accomplished by operating the control system in its manual mode and verifying that when the coolingstat contacts or the humidistat contacts are open, irrigation is stopped. The coolingstat contacts may be opened by using a pencil to move the sensor arm 37 away from its contact point. The humidistat may be checked out by moving dial 29 until a slight click is heard at about the current RH reading. Irrigation will stop and start as the dial is moved above and below this point. The dial is then set at the threshold set point which is unique to each geographical area 5 & 5A. In the event that the sensor prevents irrigation prematurely, the set point is raised slightly until the desired degree of "forecast" is achieved. Conversely, if the sensor allows irrigation after precipitation starts, the dial setting is lowered until the desired degree of "forecast" is achieved.

When early morning watering schedules are programmed in the clock or computer, the higher setpoint is used such as 81% shown in FIG. 5A. When evening watering schedules are programmed in the clock or computer, the lower set point is used such as 57% shown in FIG. 5A. The lower the set point level (while maintaining healthy greenery), the greater the water and cost savings. Since the sensor set point may be fine tuned to the local precipitation threshold, this potential savings can be realized. Once the preferred embodiment is set for the preferred irrigation schedule and the optimum set point, there is virtually no need to manually tend to the controller-year-around.

CONCLUSION AND CLAIMS

This invention has been described in its presently conceived best mode, and it is clear that it is susceptable to many changes, modes of operation and embodiments within the ability of those skilled in the art and without the exercise of the inventive facility such as the integration of the preferred embodiment with an outdoor mounted irrigation timer and computer control boxes and the use of a single preferred embodiment as a central real time weather controlled interrupter for many satellite timers or computer control systems.

Accordingly, the scope of this invention is defined by the scope of the following claims.

What is claimed is:

1. A differential relative humidity and temperature responsive device for controlling exterior water sprinklers, which comprise solenoids connected to sprinkler heads, said device comprising:

Means for setting a humidity threshold at a humidity value based on the approximate average of the highest humidity measurements taken periodically during a selected time period;

Means for setting a temperature threshold at a temperature value;

An electrical load;

Means for controlling energy to said load including an electrical controller connected at its output to said electrical load;

Means for sensing ambient temperature and providing a temperature value;

Means for sensing ambient humidity and providing a humidity value; and

Comparator means connected at the input to said controller for receiving the output of said humidity and temperature threshold setting means and comparing the humidity and temperature values with the output values of said temperature and humidity sensing means so as to open or close said energy controlling means to said load;

Whereby when the ambient humidity exceeds the pre-set threshold humidity value or the ambient temperature is less than the pre-set threshold temperature value, no energy is passed by the controller to said load; and Wherein said electrical load comprises at least one solenoid in cooperative arrangement with at least one of the exterior water sprinklers so as to open or close water flow to the sprinkler heads.

2. The differential relative humidity and temperature responsive device of claim 1 wherein the humidity value set in said means for a humidity threshold is based on the approximate average of the highest humidity measurements taken periodically during an annual time period at specific times during the day.

3. The differential relative humidity and temperature responsive device of claim 1 wherein the humidity value set in said means for setting a humidity threshold is based on the approximate average of the highest humidity measurements taken periodically during a monthly time period at specific times of the day, said threshold value is set at said average for the corresponding month and time of day in a prior year, during which said measurements are taken.

4. The differential relative humidity and temperature responsive device of claim 1 wherein the temperature value set in said means for setting a threshold temperature is in the range of 5 degrees to 10 degrees above 32 degrees F.

5. The differential relative humidity and temperature responsive device of claim 1 wherein said electrical load comprises at least one solenoid in cooperative arrangement with at least one of the exterior water sprinklers so as to open or close water flow to the sprinkler head.

6. The differential relative humidity and temperature responsive device of claim 1 wherein said comparator means compares the set threshold humidity value with the humidity output value of said means for sensing ambient humidity and prevents energy flow to said means for controlling energy to said load when the ambient humidity is greater than the threshold humidity setting.

7. The differential relative humidity and temperature responsive controller for exterior water sprinklers comprising:

a. a housing having openings to the ambient air;

a humidistat comprising a humidity threshold setting means adjustable to a pre-selected humidity value based on the humidity in the geographic area in which the controller is used and on the pre-recorded maximum humidity measurements take periodically over an established period of time in the geographic area and ambient humidity sensing means;

a coolingstat in serial connection with said humidistat comprising a temperature threshold setting means adjustable to pre-selected temperature value, and means for sensing ambient temperature;

an electrical load; and means for controlling energy to said electrical load connected to said humidistat and coolingstat, whereby when the ambient humidity exceeds the threshold humidity level or the ambient temperature is less than the temperature threshold setting, no energy is passed by said control means to said electrical load.

* * * * *